May 23, 1967 W. W. POCKMAN ETAL 3,320,930
ADJUSTABLE FEEDING TROUGH FOR POULTRY LAYING CAGES
Filed April 14, 1966 2 Sheets-Sheet 2
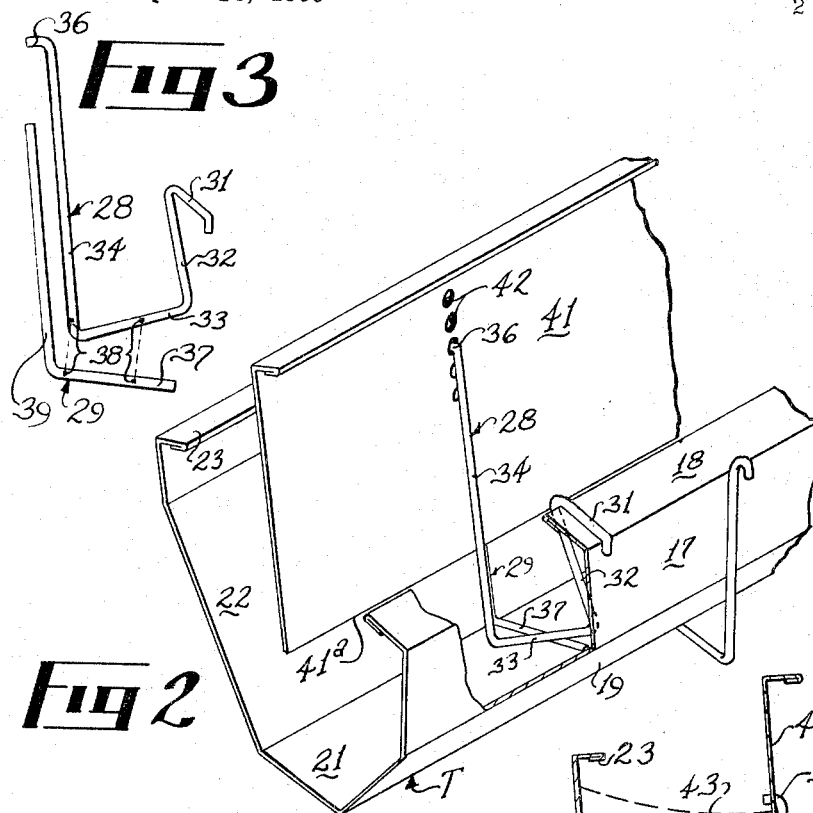
INVENTORS
William W. Pockman
Leonard M. Skinner
BY
Jennings Carter & Thompson
Attorneys

United States Patent Office 3,320,930
Patented May 23, 1967

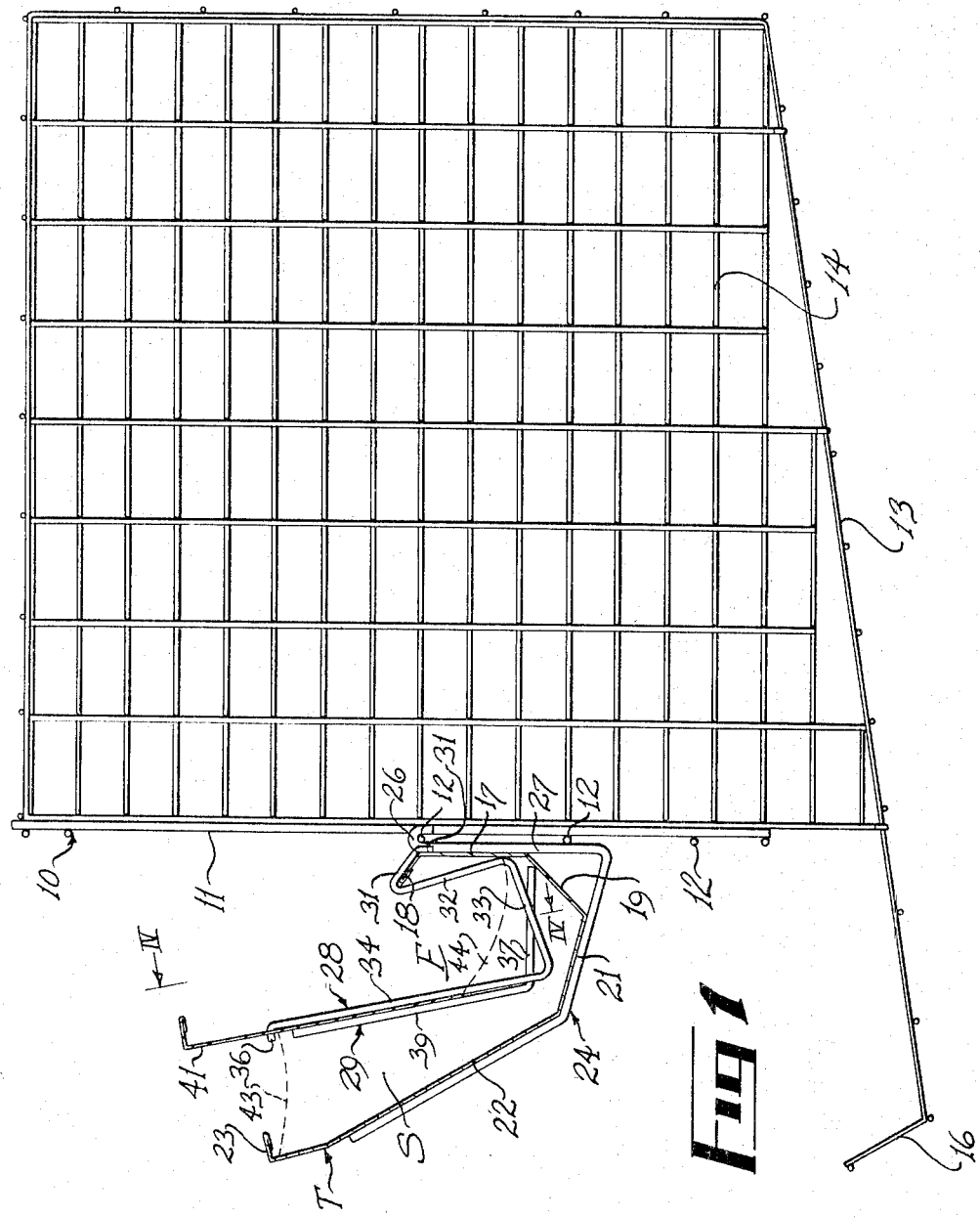

3,320,930
ADJUSTABLE FEEDING TROUGH FOR POULTRY LAYING CAGES
William W. Pockman and Leonard M. Skinner, Decatur, Ala., assignors to Montgomery & Crawford, Inc., a corporation of Delaware
Filed Apr. 14, 1966, Ser. No. 542,621
3 Claims. (Cl. 119—18)

ABSTRACT OF THE DISCLOSURE

An adjustable feed trough for attachment to poultry laying cages wherein the trough proper is divided into a feed storage section and a section which is accessible to the poultry in the cage, the division being by means of a baffle, the baffle being mounted in the trough in vertically adjustable fashion so as to divide the trough into the storage and feeding sections.

---

Our invention relates to feeding troughs for laying cages.

Our invention contemplates a feed trough which may be attached to the front of a poultry laying cage and which embodies improved means for regulating the flow of feed from a front or storage section of the trough to a rear or feeding section thereof, whereby a relatively large quantity of feed may be stored in the trough and automatically, by gravity, supplied to the chickens in the cage.

An object of our invention is to provide an adjustable, baffle type feed trough in which the baffle is removably mounted on the feed trough and in which the baffle is adjustable so that the position of its lower edge relative to the bottom of the trough may be adjusted, thus to vary the amount of feed which flows to the feeding portion or section of the trough, whereby this amount may be adjusted as desired and further to take care of different types of feed, some of which have more or less tendency to flow.

Specifically, our invention contemplates a support for an adjustable baffle which embodies a wire having a pair of vertically disposed baffle supporting and engaging sections, there being a forwardly turned end on one of the vertical sections of wire adapted to enter selectively into holes in the baffle, thus to adjust its height, and there being a bent portion on said wire, at its rear end, whereby the baffle may be hung from the trough.

In the art to which our invention relates it is desirable for hens in laying cages to have, within easy reach and at all times an adequate supply of feed. In the past it has been the habit to provide a trough completely open at its top and to keep this well supplied with feed such as crushed grain and the like. In eating from such trough the chickens tend to spill a great part of the feed on the floor, thus wasting it. Furthermore, open troughs as heretofore used have required frequent replenishment of the feed by the operator, thus requiring an inordinate amount of time and attention to providing such feed.

Briefly, our invention contemplates an adjustable baffle together with means mounting the same so as to divide the trough into what might be called a storage section and a feeding section. In order to clean the trough it is desirable that the baffle be completely removed, this in turn requiring that the baffle and its supporting means should be quite simply and easily attached to and detached from the trough. Furthermore, we have found it desirable to support the baffle from the back wall of the trough. The reason for this is that most granular feeds of the type in question tend to resist flow through a restricted area. By supporting the baffle after the fashion of our invention vibration imparted to the front of the trough, as for instance, by egg gathering mechanisms moving down the aisles between the cages causes the front of the trough to vibrate independently of the baffle, thereby causing the feed to flow under the lower edge thereof. Our invention further provides an extremely simple and inexpensive manner of supporting the baffle while providing easy means for adjusting the same vertically.

Our improved feed trough and baffle arrangement is illustrated in the accompanying drawings forming a part of this application in which:

FIG. 1 is a side elevational view of a typical laying cage with one embodiment of our improved trough and baffle arrangement in place on the front thereof, the trough and baffle being in section;

FIG. 2 is a fragmental detailed view of the embodiment shown in FIG. 1, certain parts being broken and in section, and looking at a length of the trough with the baffle in place thereon, as the same is viewed from the rear;

FIG. 3 is an exploded view of the baffle supporting wires shown in FIG. 1 detached from each other;

FIG. 4 is a detail sectional view taken generally along line IV—IV of FIG. 1;

FIG. 5 is a detail sectional view taken generally along line V—V of FIG. 4;

FIG. 6 is a detail sectional view taken generally along line VI—VI of FIG. 5, the view being slightly enlarged;

FIG. 7 is a fragmental view corresponding to FIG. 2 showing another embodiment of our improved trough and baffle, certain parts being broken away and in section; and FIG. 8 is a side elevational view showing the embodiment of FIG. 7 in greater detail, the cage being omitted for the sake of clarity.

Referring now to the drawings for a better understanding of our invention we show in FIG. 1 a typical laying cage for poultry indicated generally at 10. As is understood, the cage is made up of wire mesh material and embodies a front panel 11 which has a plurality of spaced wires, both horizontal and vertical, a few of the horizontal wires being indicated by the numeral 12. In like manner, the cage embodies a wire mesh bottom panel 13 and wire mesh side panels 14. The eggs roll out of a suitable opening at the front onto an egg shelf indicated at 16 and it will be understood chickens have access to feed placed in the trough indicated generally by the letter T, the trough being mounted on the front of the cage as will be described.

As illustrated in the drawings the trough T embodies a rear wall 17; an upwardly and forwardly inclined wall 18, the outer edge of which may be bent upon itself as shown. The trough further embodies a forwardly and downwardly sloped section 19, an upwardly and forwardly sloped section 21 and a front upwardly sloped wall 22 terminating in a rearwardly turned lip portion 23.

It will be understood that the laying cages 10 are placed side by side in rows and there may be as many as several hundred to a row. It will further be understood that the trough T extends along the front of the rows and is continuous from end to end, or at least, is continuous in front of a plurality of the side by side cages.

The trough is supported at intervals by means of a support member 24 which may be in the form of a wire bent to the shape illustrated with a hook 26 on its rear end adapted to fit over one of the horizontal wires 12 of the cage. As illustrated, a vertical leg 27 of the wire 24 bears against the side of one of the wires 12 which is lower than the wire 12 over which the hook 26 is placed.

As so far described, it will be apparent that the trough is installed simply by engaging a plurality of the wires 24, spaced along the row of cages, and simply inserting the trough in place.

The embodiment of our improved baffle support illustrated in FIGS. 1 through 6 comprises an integrally formed length of wire 28 and a second integrally formed length of wire 29. The wire 28 is provided at its rear end with a downwardly bent portion 31 having a hook portion 31ª thereon which is adapted to fit over the upper wall 18 and rearwardly of the vertical wall 17 of the trough. A knee brace portion 32 extends downwardly from the section 31 and contacts the front surface of the rear wall as illustrated. From this point the wire is provided with a section 33 joined to a generally vertically extending length or section 34, the latter being provided with a forwardly turned, short section 36 at its upper end.

The wire support 29 embodies a leg portion 37 which is welded at 38 at the point where the section 37 crosses the section 33 of the wire 28. The wire 29 includes a vertically extending section 39, generally parallel to portion 34 of wire 28 and slightly spaced forwardly therefrom.

The baffle plate 41, as will be understood, extends the length of the trough, or substantially so. The baffle is provided, with at intervals, with a vertically aligned series of openings 42. The openings are disposed to receive the inturned ends 36 of the wires 28, whereby the lower edge 41ª of the baffle may be adjusted relative to the bottom 21 of the trough T. It will be understood that a sufficient number of the trough supporting units comprised of the wires 28 and 29 are provided to give adequate support to the baffle. Accordingly, it will be seen that the trough support wires may be placed anywhere along the length of the trough T.

In the embodiment illustrated in FIGS. 7 and 8 the baffle support comprises a single length of wire 35. Wire 35 is bent back upon itself to provide a pair of generally vertical baffle support sections 34ᵇ and 39ᵇ. Vertical section 34ᵇ is provided with a short forwardly turned section 36ᵇ at its upper end. The vertical sections 34ᵇ and 39ᵇ are spaced apart a distance to receive baffle 41. Openings 42 in baffle 41 receive the short section 36ᵇ as described above, whereby the baffle 41 may be adjusted relative to the bottom wall 21 of trough T.

The lowermost end of the vertical section 34ᵇ contacts the bottom wall 21 of the trough. A brace portion 32ᵇ of wire 35 extends from the lowermost end of section 34ᵇ to a point 46 under lip 18 of the trough. From point 46 the wire 35 is bent to form a hook 26ᵇ adapted to engage the lip 18 and rear wall 17. Hook 26ᵇ is formed of a double thickness of wire, wire 35 being bent back upon itself as indicated at 47. A second brace portion 48 of wire 35 extends from the lowermost end of the vertical section 39ᵇ to a second point 46 under lip 18 of the trough, the wire 35 forming hook 26ᵇ from this point, as described.

From the foregoing it will be readily seen that our improved trough and baffle therefor is simple of manufacture, easy of installation and quite easy of adjustment. All the operator has to do to adjust the baffle vertically is to slide the ends 36 of the wire 28 out of the holes 42 and move the baffle up or down as desired.

It will be understood that the baffle divides the trough T into a storage section S at the front and a feeding section or space F at the rear. When the trough is filled with granular feed up to, say, the line 43, it will flow by gravity generally to the level indicated by the line 44. Thus, at one operation the operator may fill the trough with enough feed to last the chickens for several days.

It will be especially noted that the baffle is hung from the side of the trough nearest the cage that is herein called the back side of the trough. In gathering eggs it is customary in modern plants to employ some form of mechanism which runs down the aisles between the cages, consequently vibrating the front wall of the trough T. This has the advantage of causing the feed more readily to flow under the edge of the baffle, assuring that it does not bridge over and fail to flow.

In practice our invention has proved to be extremely satisfactory and practical in every way. It is economical of manufacture and lends itself readily to mass production methods of fabrication. Further, and importantly, it is easy to apply to existing troughs and affords a sure and steady flow of feed to the chickens with a minium of labor on the part of the operator.

While we have shown our invention in but two forms, it will be obvious to those skilled in the art that it is not so limited, but is susceptible of various changes and modifications without departing from the spirit thereof, and we desire, therefore, that only such limitations shall be placed thereupon as are specifically set forth in the appended claims.

What we claim is:

1. In an adjustable feed trough for attachment to poultry laying cages,
    (a) a trough proper comprising
        (1) a generally vertically disposed back wall with a forwardly directed lip at the upper edge thereof,
        (2) a forwardly directed bottom wall joined to the lower edge of the back wall, and
        (3) an upwardly and forwardly directed front wall joined to the forward edge of the bottom wall,
    (b) a plate-like feed regulating baffle disposed to divide the trough longitudinally into a feeding portion and a storage portion,
    (c) support means adapted to hold said baffle with its lower edge at selected distances above the bottom of the trough and comprising
        (1) a first wire-like member embodying a rear hook part fitting over said lip and behind the top edge of the back wall and a vertically directed portion having a forwardly directed end at its top, and
        (2) a second wire-like member secured to said first wire-like member and having a vertical portion spaced from the vertical portion of said first wire-like member a distance sufficient to receive the plate-like baffle, and,
    (d) said baffle being provided with vertically spaced openings adapted selectively to receive the forwardly directed end of the first wire-like member whereby the baffle is held with its lower edge at selected distances above the bottom of the trough, thereby regulating the flow of feed from the storage portion of the trough to the feeding portion thereof.

2. In adjustable feed trough as defined in claim 1 in which said first wire-like member is provided with a knee brace portion in contact with the front surface of the back wall.

3. In an adjustable feed trough for attachment to poultry laying cages,
    (a) a trough provided with a generally vertically disposed back wall with a forwardly directed lip at the upper edge thereof,
    (b) a plate-like feed regulating baffle disposed to divide the trough longitudinally into a feeding portion and a storage portion,
    (c) support means for said baffle comprising an integral wire-like member embodying
        (1) a pair of substantially vertically disposed portions spaced from each other a distance to receive the baffle, the rearmost one of said vertically disposed portions having a forwardly directed end at its top,
        (2) upwardly and rearwardly directed portions extending from the bottom ends of said vertically disposed portions to the lowermost surface of said lip, and
        (3) hook portions formed integrally with each each other and said upwardly and rearwardly directed portions and adapted to engage said forwardly directed lip, and (d) said baffle being provided with vertically spaced openings adapted selectively to receive the forwardly directed end of the rearmost one of said vertically disposed portions of said wire-like member, whereby the baffle is held with its lower edge at selected distances above the bottom of the trough, thereby regulating the flow of feed from the storage portion of the trough to the feeding portion thereof.

References Cited by the Examiner

UNITED STATES PATENTS

| | | | |
|---|---|---|---|
| 2,056,814 | 10/1936 | Winn | 119—33 |
| 2,061,712 | 11/1936 | Martin | 119—31 |
| 2,436,095 | 2/1948 | Brossia | 119—18 |

SAMUEL KOREN, *Primary Examiner.*

HUGH R. CHAMBLEE, *Examiner.*